United States Patent Office 3,481,800

Patented Dec. 2, 1969

3,481,800

PRODUCTION OF HARD SUPERCONDUCTORS

Isolde Dietrich, Munich, Erhard Berkl, Garching, and Reinhard Weyl, Munich, Germany, assignors to Siemens Aktiengesellschaft, Munich, Germany, a corporation of Germany No Drawing. Filed Sept. 26, 1966, Ser. No. 581,775
Claims priority, application Germany, Sept. 27, 1965, S 99,694
Int. Cl. C22f *1/00*
U.S. Cl. 148—11.5 5 Claims

ABSTRACT OF THE DISCLOSURE

A method for producing hard superconducting materials wherein the initial material is annealed in solid state in an ultra high vacuum for degassing and homogenization, then so installing into the material a gas such as oxygen, hydrogen and nitrogen, that no separations or disassociations occur, thereafter cooling the material sufficiently quickly that essentially no disassociation or separation occurs during the cooling, and thereafter, cold-forming the material so treated.

The invention relates to a process for the production of so-called hard superconducting materials, particularly so-called conductors of III, type which exhibit high critical current density values at high magnetic field strength values and appropriately low temperatures.

As hard superconducting materials, mixed crystal superconductors out of two or more components, such as for example, niobium-zirconium, niobium-tantalum, have become known.

With regard to a number of niobium-zirconium alloys it has been discovered that additional impurities of small quantities of oxygen, nitrogen can increase the critical current density values, as for example, described in "Physics Letters," volume 1, number 1, July 1, 1962, pages 292–295. This effect of the oxygen or nitrogen in the superconducting material is there explained by means of the dissociation into two phases which is caused through the absorption of impurities, primarily of oxygen or nitrogen. It became evident that the oxygen, for example, is the reason for the phase separation, i.e., for the dissociation.

Up to now it was supposed that this phase transition is important in order to obtain an increase of the critical current density values and that by means of the addition of oxygen or nitrogen through which such phase transitions are caused, a possibility for the improvement of the superconducting qualities of a material is presented. These concepts had been gained during tests during which, for example, niobium-zirconium alloy was annealed at approximately 800° C., i.e., in the range in which dissociation may occur. Examinations also have been undertaken of superconducting material which consists of only one component, for example, of niobium, and into which different gases, for example, nitrogen, oxygen, hydrogen and deuterium, were installed. However, superconductors with only one metallic component have, from the first, had little technical importance since in spite of the most varied after treatment they always exhibited only small critical values.

The invention relates to a process for the production of hard superconducting material out of more than just one metallic component which is, according to the invention, characterized in that the material is first of all in a manner known in itself annealed in an ultra high vacuum, i.e., at pressures approximately smaller than $10^{-7}$ torr up to the almost complete homogenization and degassing, i.e., until the material can practically not be any further homogenized and practically does not give off any further gas. The material is annealed in the atmosphere of the gas to be installed at a pressure suitable for the building-in operation, and at temperatures at which no dissociation or separation occurs, until the gas is uniformly distributed in the material, following which the material is cooled so quickly that essentially no dissociation or separation occurs during cooling. The material treated in such a manner is subsequently treated in a manner known per se by means of a cold forming. As gases to be built in, oxygen, nitrogen and hydrogen come under consideration. The pressure should be kept sufficiently small that no scaling layer or only an inconsequential scale layer occurs. For Nb-Zr, depending upon the temperature, a pressure of approximately $10^{-5}$ to $10^{-6}$ torr is suitable. The annealing time is dependent upon the temperature and naturally also involves the size, for example, the cross section of the specimen to be treated. According to the invention the annealing temperature should be selected sufficiently high that no further dissociation occurs. For niobium-zirconium, a temperature of more than approximately 1000° C. is suitable. The cooling may be undertaken in a manner known per se. It merely has to be accomplished so quickly that no substantial dissociation occurs. In the process according to the invention, the annealing temperatures are proportioned so high that unlimited miscibility of the metallic components exists. This is an essential difference in comparison with the known process in which the annealing temperature must, according to the separation there desired, lie below the temperature of unlimited miscibility, i.e., at temperatures at which several phases may exist.

Through the choice of the individual parameters, annealing temperature, annealing time and pressure, a defined installation of the provided gases is possible.

The concept that even when no dissociation of the phases occurs, an improvement of the critical values of a hard superconducting material of two or more metallic components may be obtained through a building-in of gases such as oxygen, nitrogen or hydrogen, led to the invention.

It is a further advantage of the process according to the invention that it does not tend to render the material brittle so that an after-treatment by a cold-forming operation does not present any difficulties.

It is a further advantage in the process according to the invention, that, owing to the uniform gas diffusion at the high temperatures, the annealing time is essentially determined only by the dimensions of the specimen and practically does not depend upon the structure of the specimen then existing. Therefore generally accurate annealing times and annealing temperatures may be obtained for specific measurements by means of a single test series.

Changes may be made within the scope and spirit of the appended claims which define what is believed to be new and desired to have protected by Letters Patent.

We claim:

1. A process for the production of a hard superconducting material, consisting of at least two metallic components which form a mixed crystal superconductor, and which additionally contain a gas selected from the class consisting of oxygen, nitrogen and hydrogen, comprising the steps of annealing the material, consisting of the metallic components, while such material is in a solid state, in an ultra high vacuum up to almost complete homogenization and de-gassing, then annealing said solid-state material in an atmosphere of the gas to be installed at a pressure suitable for the building-in operation and at temperatures at which no dissociation or separation occurs, for such period of time that the gas is approximately uniformly distributed in the material, thereafter cooling the material so quickly that essentially no dissociation or separation occurs during the cooling, and thereafter cold-forming the material so treated.

2. A process according to claim 1, wherein the material is annealed in a gas atmosphere with a pressure of approximately $10^{-5}$ to $10^{-6}$ torr.

3. A process according to claim 2, wherein the material is annealed in an atmosphere of oxygen.

4. A process according to claim 2, wherein the material is annealed in an atmosphere of nitrogen.

5. A process according to claim 2, wherein the material is annealed in an atmosphere of hydrogen.

References Cited

UNITED STATES PATENTS 3,275,480 9/1966 Betterton et al. ------ 148—133

L. DEWAYNE RUTLEDGE, Primary Examiner

W. W. STALLARD, Assistant Examiner